United States Patent [19]

Hoshi et al.

[11] 4,297,235

[45] Oct. 27, 1981

[54] METHOD OF PREPARING A MICROCAPSULE DISPERSION

[75] Inventors: Yoshiyuki Hoshi; Takayuki Hayashi; Fujio Kakimi, all of Fujinomiya, Japan

[73] Assignee: Fuji Photo Film Co., Ltd., Minami-ashigara, Japan

[21] Appl. No.: 91,309

[22] Filed: Nov. 5, 1979

[30] Foreign Application Priority Data

Nov. 7, 1978 [JP] Japan ............................. 53-136964

[51] Int. Cl.$^3$ ............................................ B01J 13/02
[52] U.S. Cl. .................................... 252/316; 427/151; 428/307; 428/914
[58] Field of Search ........................................ 252/316

[56] References Cited

U.S. PATENT DOCUMENTS

| 3,447,945 | 6/1969 | Mishima et al. | 428/307 X |
| 3,576,660 | 4/1971 | Bayless et al. | 252/316 X |
| 4,001,140 | 1/1977 | Foris et al. | 427/151 X |

Primary Examiner—Richard D. Lovering
Attorney, Agent, or Firm—Sughrue, Mion, Zinn, Macpeak and Seas

[57] ABSTRACT

A method of preparing a dispersion of microcapsules whose walls comprise formaldehyde as one of the wall components characterized by adding urea, a sulfite or a hydrogensulfite to said dispersion.

9 Claims, No Drawings

METHOD OF PREPARING A MICROCAPSULE DISPERSION

BACKGROUND OF THE INVENTION

1. Field of the Invention

This invention relates to a method of minimizing the irritating odor of an encapsulized solution that is produced by the residual formaldehyde. More particularly, this invention relates to a method of minimizing the malodor emitted when formaldehyde is used as one ingredient of a microcapsule wall.

2. Description of the Prior Art

In recent years, many encapsulation processes have been proposed in which microcapsule walls are made from a resin produced by addition condensation of formaldehyde and an amino compound or a phenol. Specific examples of these processes are disclosed in Japanese Patent Application (OPI) Nos. 84882/78 (The term "OPI" as used herein refers to a "published unexamined Japanese patent application"), 84883/78, 84881/78, 66878/77, 144383/76, 9079/76, 42380/72, Japanese Patent Publication No. 18671/77 and U.S. Pat. No. 3,993,831.

However, problems are inherent in these prior art methods due to the presence of a large amount of residual formalin in the microcapsule dispersion. For example, production of a pressure-sensitive copying paper involves coating the paper with free formaldehyde as well as the capsules, and therefore, in each of the coating, processing and use stages, the formaldehyde evaporates to emit a characteristic irritating odor which does great harm to the health of workers on the production line and, therefore, is not acceptable from a physiological or hygienic management viewpoint.

One known method of minimizing the hazard of the residual formalin is to use a formaldehyde absorber which selectively absorbs the free formaldehyde. U.S. Pat. No. 3,447,945 teaches the use of urea or sodium sulfite, and Japanese Patent Application (OPI) No. 75676/76 hydroxylamine hydrochloride, as the formaldehyde absorber. These absorbers are effective to some extent in a method wherein a protective colloidal such as gelatin which hardens by reaction with formaldehyde and abounds in protective colloids is used in combination with a protective colloidal precipitant such as gum arabic to form a complex coacervate with which a hydrophobic material is encapsulized, and thereafter the protective colloidal such as gelatin is hardened by formaldehyde. However, the absorbers cannot be effectively applied to other encapsulization methods. For example, when, according to the method of Example 1 or 3 of U.S. Pat. No. 3,447,945, urea is added to the solution described in an Example of U.S. Pat. No. 4,001,140 which contained capsules having walls of urea-formaldehyde resin for the purpose of preventing the evaporation of the residual formaldehyde, the rate of reaction between urea and formaldehyde was slow and the tightness of the walls of the microcapsules decreased. When sodium sulfite was added in accordance with the method of Example 5, no adequate results were obtained. An attempt to improve the efficiency by adding more sodium sulfite resulted in rupture of the capsule walls causing the hydrophobic material to be released from the capsules and to be agglomerated to form a precipitate.

SUMMARY OF THE INVENTION

Therefore, one object of this invention is to provide an improved method of using a free formalin absorber which is applicable to a dispersion containing microcapsules whose walls are made of an amino-formaldehyde condensation resin.

It is another object of this invention to provide a method which can eliminate free formalin without reducing the tightness of microcapsule walls or rupturing the walls.

Still another object of this invention is to provide a method of further decreasing the final residual content of free formalin without adversely affecting the microcapsule wall.

DETAILED DESCRIPTION OF THE INVENTION

The method of this invention preferably comprises the following basic steps:

(1) Preparing a dispersion containing microcapsules whose walls are made of an amino-formaldehyde condensation resin;

(2) Adding urea to the capsule dispersion and heating under stirring for a suitable period of time during which the primary reaction for removal of free formaldehyde occurs;

(3) Adding a solution of sulfite, hydrogensulfite or a mixture thereof to the capsule dispersion and under stirring for a suitable period of time during which the secondary reaction for removal of the free formaldehyde occurs. (In some cases it may be desirable to heat the solution upon addition of the sulfite or hydrogensulfite.)

Specific examples of the processes for preparing a microcapsule dispersion in the step (1) are described in Japanese Patent Application (OPI) Nos. 144383/76 and 42380/72 and U.S. Pat. No. 4,089,802, 4,087,376, 4,100,103, 4,105,823, 4,001,140 and 3,779,941. The steps of removing the residual formaldehyde according to this invention are effectively applied to any type of formaldehyde-containing capsule dispersion, whichever method is used to prepare it.

The amount of urea added in the step (2) is in the range of from about 1/10 to 5 times, preferably from 1/5 to 3 times, greater in mols than the formaldehyde contained in the dispersion. The urea may be added in the form of an aqueous solution or as a powder to a dispersion. Then, the pH of the resulting solution is adjusted to a pH of about 2.0 to 5.0, preferably 3.5 to 4.5. The preferred heating temperature is in the range of from about 40° to 80° C. The period of heating under stirring must be properly adjusted depending on the temperature. Generally about 50% to 80% of the residual formaldehyde is removed by the addition of urea.

After the urea addition, the sulfite or hydrogensulfite is added to the dispersion. Of the hydrogensulfite and sulfite added in the step (3), the former is preferred to the latter because of its appreciable effect to reduce the residual formaldehyde. The sulfite or hydrogensulfite can be added in the form of an aqueous solution (0.1 to 7 wt%, preferably 0.4 to 4 wt%) or as the powder to a dispersion. Then, the pH of the resulting mixture has been adjusted to about 6 to 11, preferably 7 to 10. Suitable compounds for the pH adjustment are sodium hydroxide, potassium hydroxide, ammonium hydroxide, aminoalcohol, etc. The amount of hydrogensulfite and/or sulfite added is about 0.02 to 1 mol per mol of the formaldehyde, preferably about 0.06 to 0.4 mol per mol of formaldehyde. While any kind of cation can be used as a counter ion for sulfite or hydrogensulfite ions, $Na^+$, $K^+$ and $NH_4^+$ are preferred.

Going through these steps, the method of this invention not only eliminates the problems involved in using urea or sulfite independently to reduce the content of residual formaldehyde in a dispersion of microcapsules whose walls are made of an amino-formaldehyde condensation resin but it also reduces the residual formaldehyde more than when urea or sulfite is used independently. In addition, the use of a hydrogensulfite instead of the sulfite can reduce the residual formaldehyde content to about a third of the initial level.

This invention is now described in greater detail by reference to the following examples and a comparative example which are given here for illustrative purposes only and are by no means intended to limit the scope of the invention. In the examples, all percents and parts are by weight.

EXAMPLE 1

A powder of ethylene-maleic anhydride copolymer (having a molecular weight of 75,000 to 90,000 and available from U.S. Monsanto under the trade name of EMA-31) was dissolved in water with heat to prepare a 10 wt% aqueous solution. A mixture of 10 parts of urea, 1 part of resorcinol and 55 parts of water was dissolved in 100 parts of the aqueous solution under stirring. The resulting solution was mixed with a 20 wt% aqueous solution of sodium hydroxide to adjust the pH to 3.5. A hundred parts of diisopropylnaphthalene having dissolved therein 2.5% crystal violet lactone and 1.0% benzoyl leucomethylene blue were poured into the adjusted solution with vigorous stirring which continued until an O/W emulsion having an average oil droplet size of 4 microns was formed.

The emulsion was mixed with 25 parts of a 37 wt% aqueous solution of formaldehyde under stirring to thereby adjust the system temperature of 65° C., and this temperature was held for 2 hours under stirring to complete the encapsulization reaction. The resultant microcapsule dispersion contained 9.3 g of formaldehyde and about 190 g of the vehicle excluding the internal phase. It was centrifuged to remove the internal phase, and an analysis of the transparent phase by the acetylacetone technique indicated the presence of 1.5 g of the residual formaldehyde in about 190 g of the vehicle.

The capsule dispersion was mixed with a 20% aqueous solution of sodium hydroxide to adjust its pH to 4.0, then mixed with 30 g of a 40% aqueous solution of urea (0.65 mol times greater than the formaldehyde used), heated at 65° C. for 40 minutes under stirring. Then, the pH of the system was adjusted to 9.0. The system was further mixed with 40 g of a 20% aqueous solution of sodium hydrogen sulfite. The pH of the mixture was then adjusted to 8.0 by addition of a 20% aqueous solution of sodium hydroxide, and the mixture was stirred for 30 minutes at a controlled temperature of 65° C. to reduce the residual formalin content to 0.11 g. The above-described capsule dispersion was designated Sample A.

EXAMPLE 2

A powder of gum arabic was dissolved in water to form a 10% aqueous solution. A mixture of 10 parts of urea, 1 part of resorcinol and 55 parts of water was dissolved in 100 parts of the aqueous solution under stirring. Thereafter, hydrochloric acid was used to adjust the pH of the system to 4.0. A hundred parts of diisopropylnaphthalene having dissolved therein 2.5% crystal violet lactone and 1.0% benzoyl leucomethylene blue were poured into the adjusted solution with vigorous stirring which continued until an O/W emulsion having an average oil droplet size of 5 microns was formed.

The emulsion was mixed with 6 parts of a 10% aqueous solution of ammonium chloride, and then with 22 parts of a 37% aqueous solution of formaldehyde under stirring. The system temperature was adjusted to 65° C. and this temperature was maintained for 2 hours under stirring to complete the encapsulization reaction. The resulting microcapsule dispersion contained 8.1 g of formaldehyde and about 200 g of vehicle excluding the internal phase. The procedure of Example 1 was repeated to perform the analysis of the capsule dispersion which indicated the presence of 1.0 g of the residual formaldehyde in about 200 g of the vehicle.

The capsule dispersion was mixed with a 20% aqueous solution of sodium hydroxide to adjust its pH to 4.0, then mixed with 30 g of a 40% aqueous solution of urea (0.74 times greater in mol than the formaldehyde used), heated at 65° C. for 40 minutes under stirring. Then the pH of the system was adjusted to 9.0, and further mixed with 40 g of a 20% aqueous solution of sodium hydrogensulfite. The pH of the mixture was adjusted to 8.0 by addition of a 20% aqueous solution of sodium hydroxide, and the mixture was stirred for 30 minutes at 65° C. to reduce the residual formaldehyde content to 0.08 g. The above-described capsule dispersion was designated Sample B.

COMPARATIVE EXAMPLE 1

Sample capsule dispersion C was prepared by repeating the procedure of Example 1 except that the combination of 12 g (0.20 mols) of urea and 8 g (0.08 mols) of sodium hydrogensulfite added to reduce the residual formaldehyde content was replaced by 17 g (0.28 mols) of urea added at a pH of 4.0 (sodium hydrogensulfite was not used). Sample capsule dispersion D was prepared by repeating the procedure of Example 1 except that 8 g (0.08 mols) of sodium hydrogensulfite was replaced by 10 g (0.08 mols) of sodium sulfite. Sample capsule dispersion E was prepared by repeating the procedure of Example 1 except that the combination of 12 g (0.20 mols) of urea and 8 g (0.08 mols) of sodium hydrogensulfite added to reduce the residual formaldehyde content was replaced by 35 g (0.28 mols) of sodium sulfite added at a pH of 9.0 (urea was not added). Table 1 below shows the residual formalin content of each of Samples A, C, D and E as well as the problems they had, if any.

TABLE 1

| Sample | Type of Formaldehyde Remover Used | Amount (mol) | Residual Formaldehyde Content | Problems |
|---|---|---|---|---|
|  | No remover used | — | 1.5 g | Much residual formaldehyde |
| C | Urea | 17 (0.28) | 0.38 g | Capsule walls less tight |
| E | Sodium sulfite | 35 (0.28) | 0.34 g | Capsule walls ruptured |
| D | Urea and sodium sulfite | 12 (0.20) 10 (0.08) | 0.30 g | None |

TABLE 1-continued

| Sample | Type of Formaldehyde Remover Used | Amount (mol) | Residual Formaldehyde Content | Problems |
|---|---|---|---|---|
| A | Urea and sodium hydrogensulfite | 12 (0.20) 8 (0.08) | 0.11 g | None |

While the invention has been described in detail and with reference to specific embodiments thereof, it will be apparent to one skilled in the art that various changes and modifications can be made therein without departing from the spirit and scope thereof.

What is claimed is:

1. In a method of preparing a dispersion of microcapsules whose walls comprise formaldehyde as one of the wall components, the improvement which comprises
preparing a dispersion containing microcapsules with microcapsule walls of an amino-formaldehyde condensation resin,
adding urea to the capsule dispersion in the range from about 1/10 to 5 times greater on a molar basis than the formaldehyde contained in the dispersion, heating the capsule dispersion with stirring, and adding a solution of sulfite, hydrogensulfite or a mixture thereof to the capsule dispersion in the range from about 0.02 to 1 mol per mol of formaldehyde.

2. The method of claim 1, wherein said sulfite and/or hydrogensulfite is potassium, sodium or ammonium sulfite or hydrogensulfite.

3. The method of claim 1, wherein after adding urea to the dispersion, the dispersion is heated at a temperature of about 40° to 80° C.

4. The method of claim 3, wherein said dispersion is heated for a time sufficient to remove about 50 to 80% of the residual formaldehyde in said dispersion.

5. The method of claim 1, wherein said urea is added to said dispersion as an aqueous solution.

6. The method of claim 1, wherein the pH of said urea-containing dispersion is about 2.0 to 5.0.

7. The method of claim 1, wherein said urea is added to said dispersion as a powder.

8. The method of claim 1, wherein said method includes heating said sulfite and/or hydrogensulfite-containing dispersion for a time sufficient to remove substantially all formaldehyde from the dispersion.

9. The method of claim 1, wherein the pH of said sulfite and/or hydrogensulfite-containing dispersion is about 6 to 11.

* * * * *